(12) United States Patent
    Pidancier

(10) Patent No.: US 12,580,379 B2
(45) Date of Patent: Mar. 17, 2026

(54) ELECTRONIC SWITCHING PROTECTION APPARATUS WITHOUT GENERATING AN ELECTRIC ARC

(71) Applicant: HAGER-ELECTRO SAS, Obernai (FR)

(72) Inventor: Benjamin Pidancier, Selestat (FR)

(73) Assignee: HAGER-ELECTRO SAS, Obernai (FR)

( * ) Notice: Subject to any disclaimer, the term of this patent is extended or adjusted under 35 U.S.C. 154(b) by 391 days.

(21) Appl. No.: 18/036,167

(22) PCT Filed: Nov. 18, 2021

(86) PCT No.: PCT/EP2021/082115
    § 371 (c)(1),
    (2) Date: May 10, 2023

(87) PCT Pub. No.: WO2022/106527
    PCT Pub. Date: May 27, 2022

(65) Prior Publication Data
    US 2024/0006872 A1      Jan. 4, 2024

(30) Foreign Application Priority Data
    Nov. 18, 2020      (FR) ....................................... 2011838

(51) Int. Cl.
    *H02H 3/34*          (2006.01)
    *H02H 1/00*          (2006.01)
(52) U.S. Cl.
    CPC ............ *H02H 3/34* (2013.01); *H02H 1/0007* (2013.01)

(58) Field of Classification Search
    CPC ....... H01H 2071/048; H01H 2071/124; H01H 33/596; H01H 71/04; H01H 71/123;
    (Continued)

(56) References Cited

U.S. PATENT DOCUMENTS

| | | | |
|---|---|---|---|
| 10,176,957 B2 * | 1/2019 | Niehoff .............. | G01R 31/3277 |
| 10,290,445 B2 | 5/2019 | Schmitz et al. | |

(Continued)

FOREIGN PATENT DOCUMENTS

| | | | | |
|---|---|---|---|---|
| EP | 2320535 A1 * | 5/2011 | ............. | H02H 3/025 |
| EP | 3352193 | 7/2018 | | |

OTHER PUBLICATIONS

International Search Report dated Feb. 15, 2022.

*Primary Examiner* — Danny Nguyen
*Assistant Examiner* — Nicolas Bellido
(74) *Attorney, Agent, or Firm* — IPSILON USA, LLP

(57) ABSTRACT

An electronic switching protection apparatus that does not generate an electric arc includes a phase current line and a neutral current line and an electronic protection tripping device electrically connected to a measurement sensor (1'). A galvanic isolation mechanism (4) is provided having first and second pairs of contacts, configured to be actuated by an actuator (3). An electronic switching unit (9) has a power electronic switching component (10, 11) which is arranged on the phase current line, and is able and intended to be made to trip by the protective trip control signal representative of the occurrence of a fault in order to open the electronic switching component (10, 11). The actuator (3) is configured to actuate the opening of the first and second pairs of contacts consecutively with the opening of the electronic switching component (10, 11).

11 Claims, 4 Drawing Sheets

(58) Field of Classification Search
CPC .... H01H 83/226; H01H 9/548; H02H 1/0007;
H02H 3/083; H02H 3/33; H02H 3/34;
H02H 3/347; H03K 17/0822; H03K
17/0826
See application file for complete search history.

(56) References Cited

U.S. PATENT DOCUMENTS

| | | | |
|---|---|---|---|
| 2012/0007657 A1 | 1/2012 | Naumann et al. | |
| 2012/0212231 A1* | 8/2012 | Dobusch | H02H 3/027 |
| | | | 307/115 |
| 2016/0203932 A1* | 7/2016 | Niehoff | H01H 47/223 |
| | | | 361/170 |
| 2017/0345600 A1* | 11/2017 | Naumann | H01H 71/123 |
| 2020/0203108 A1* | 6/2020 | Mittelstadt, I | H01H 71/04 |
| 2021/0203149 A1* | 7/2021 | Askan | H01H 9/542 |
| 2024/0387120 A1* | 11/2024 | Tannhäuser | H01H 3/001 |
| 2024/0395477 A1* | 11/2024 | Tannhäuser | H01H 71/125 |
| 2024/0404764 A1* | 12/2024 | Tannhäuser | H01H 9/548 |

* cited by examiner

ELECTRONIC SWITCHING PROTECTION APPARATUS WITHOUT GENERATING AN ELECTRIC ARC

RELATED APPLICATION

This application is a National Phase of PCT/EP2021/082115 filed on Nov. 18, 2021, which claims the benefit of priority from French Patent Application No. 20 11838, filed on Nov. 18, 2020, the entirety of which are incorporated by reference.

FIELD OF THE INVENTION

The invention relates to an electronically switched protection device.

BACKGROUND

Electrical protection devices with arc switching, of modular circuit breaker or modular residual current device type, are subjected to high stresses when short circuits occur on the installation. As a result, the product may be damaged and its performance may be impaired. Over time, damage may be caused to the electrical installation. In addition, the development and refinement of these protection devices with arc switching remains a real technical challenge.

Furthermore, the service life of this type of protection device is limited because the effects of the electric arc between the contacts and in the quenching chamber impair the protection device and pollute its environment. Performance in terms of breaking power is also limited by the size and implementation of the quenching chamber, as well as the properties of the electric arc.

OBJECTS AND SUMMARY

The aim of the present invention is to overcome these drawbacks and to provide a solution that makes it possible to avoid the problems related to the electric arc while providing a protection device of low bulk.

To this end, the invention relates to an electronically switched protection device.

BRIEF DESCRIPTION OF THE DRAWINGS

The invention will be better understood by virtue of the following description relating to multiple preferred embodiments which are given by way of non-limiting examples and are explained with reference to the appended schematic drawings, in which.

DETAILED DESCRIPTION

Figure 1:
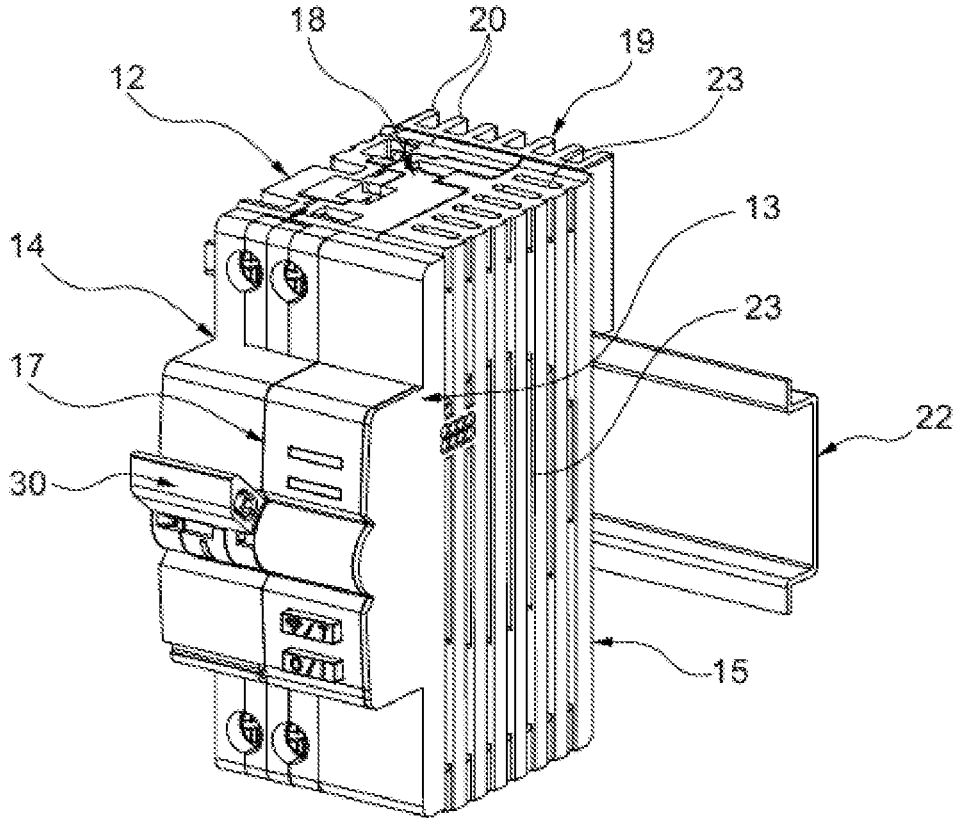
FIG. 1 shows a perspective view of the front of an electronically switched protection device according to the invention attached to a support rail.
Figure 3:
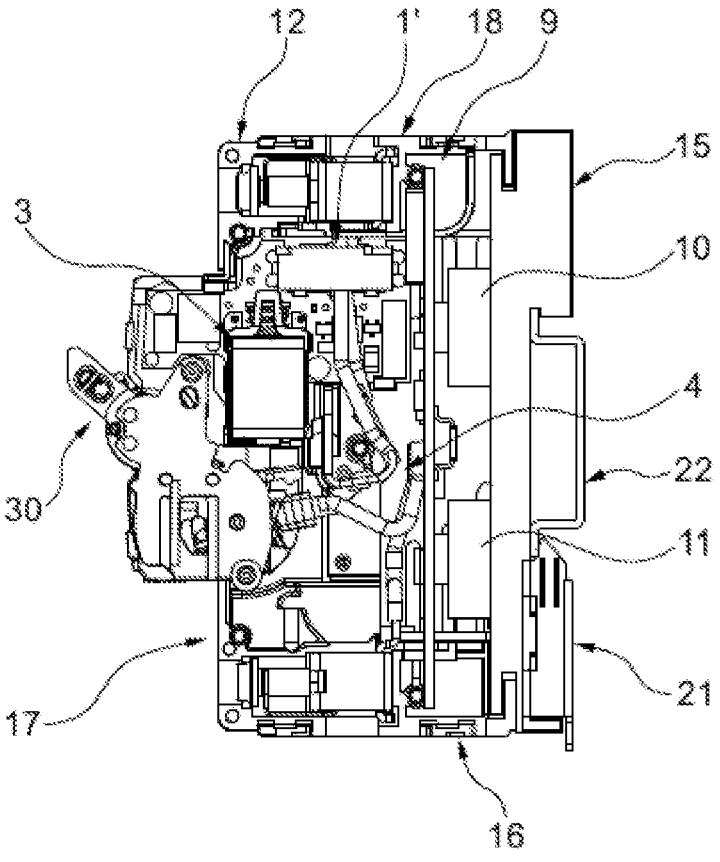
FIG. 3 shows a cross-sectional view of the electronically switched protection device according to the invention attached to the support rail.
Figure 4:
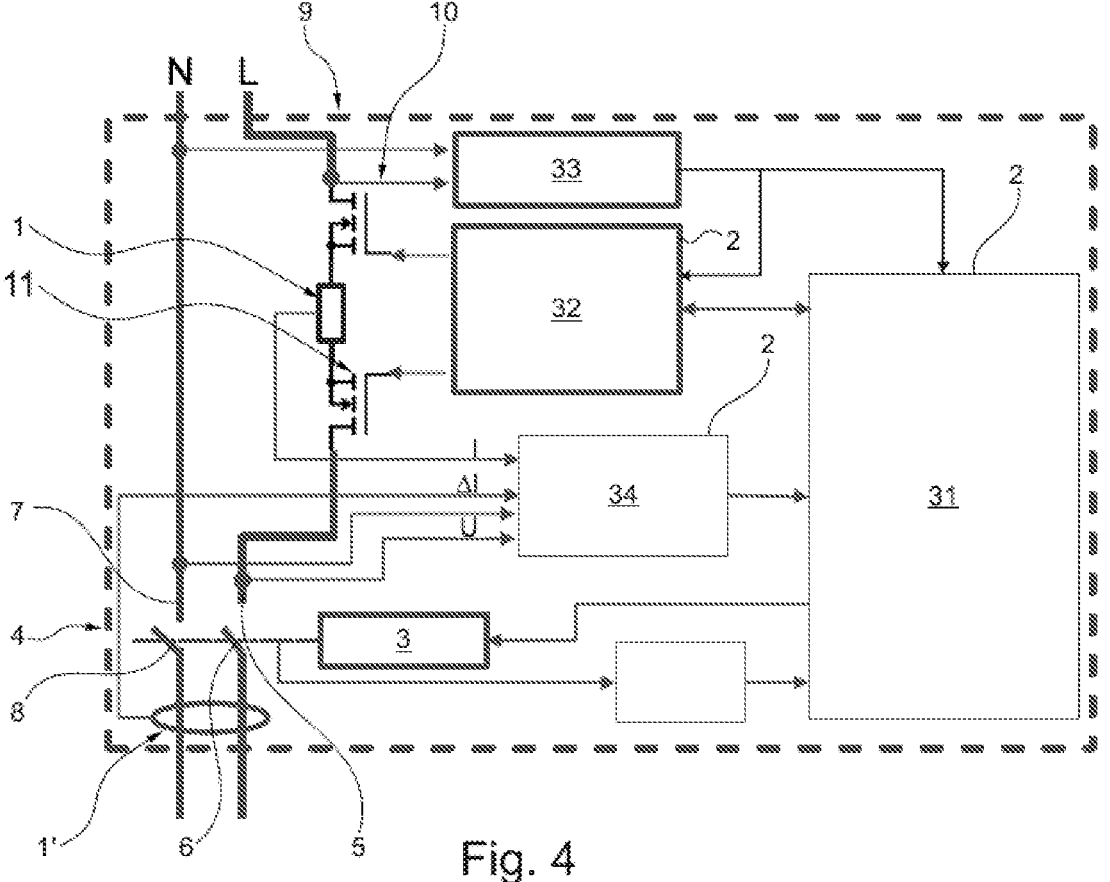
FIG. 4 shows a view of a circuit diagram of the electronically switched protection device according to the invention.

With reference to the figures, an electronically switched protection device comprises at least:

at least one phase current line L and one neutral current line N (FIG. 4), at least one current sensor 1, 1' that is able and intended at least to measure the current flowing through said at least one phase current line L or the differential current between the phase current line L and the neutral current line and to emit an acquisition signal that is representative of the image of the current flowing through said at least one phase current line L or an image of the differential current between the phase current line L and the neutral current line N (FIG. 4), an electronic protection tripping device 2 that is electrically connected to said current sensor 1, 1' and is able and intended at least to process said acquisition signal and where appropriate to emit a protective tripping control signal that is representative of the occurrence of a fault (FIG. 4), an actuator 3 that is electrically connected to said electronic protection tripping device 2 (FIGS. 3 and 4), a galvanic isolation mechanism 4 comprising at least a first pair of contacts with a first fixed contact 5 and a first mobile contact 6 that are arranged on the phase current line L and a second pair of contacts with a second fixed contact 7 and a second mobile contact 8 that are arranged on the neutral current line N, said galvanic isolation mechanism 4 being able and intended to be actuated by a control mechanism 30 of lever type designed to open or close the first and second pairs of contacts or by said actuator 3 (FIGS. 1, 3 and 4).

Figure 2:
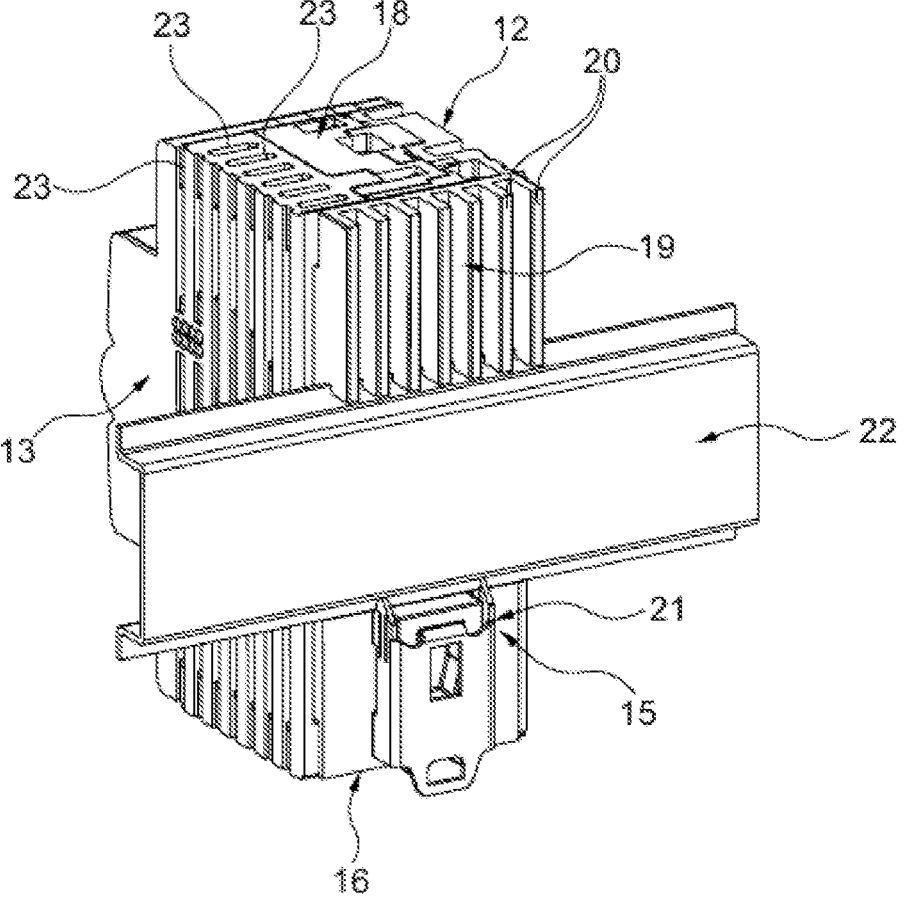
FIG. 2 shows a perspective view of the rear of the electronically switched protection device according to the invention attached to the support rail.

In accordance with the invention, said electronically switched protection device is characterized in that it comprises:

an electronic switching unit 9 comprising at least one power electronic switching component 10, 11 that is respectively arranged on said at least one phase current line L, said electronic switching unit 9 being able and intended to be made to trip by said protective tripping control signal that is representative of the occurrence of a fault so as to open said at least one electronic switching component 10, 11 (FIGS. 3 and 4), an electrical power supply 33 that is configured to supply power to the electronic protection tripping device 2 and to the electronic switching unit 9 (FIG. 4), in that the actuator (3) is configured to open the first and second pairs of contacts consecutively with the opening of said at least one electronic switching component (10, 11), and in that the electronically switched protection device comprises a housing 12 in modular format (FIGS. 1, 2 and 3).

Modular format is understood to mean a format which is preferably in accordance with the standard UTE C61-920.

Advantageously, the electronically switched protection device according to the invention makes it possible, in the event of a fault occurring, to perform a switching operation without generating an electric arc between the first and second pairs of contacts. As a result, the switching operation is carried out entirely electronically by the electronic switching unit 9 following the occurrence of a fault. Specifically, the electronic protection tripping device 2 and the electronic switching unit 9 are configured to open said at least one electronic switching component 10, 11 when a fault occurs so as to interrupt the flow of the current through the phase current line L.

The actuator 3 is configured to open the first and second pairs of contacts so as to ensure galvanic isolation upstream and downstream of the electronically switched protection device. The actuator 3 is thus configured to open the first and second pairs of contacts consecutively with the opening of said at least one electronic switching component 10, 11. This opening of the first and second pairs of contacts does not generate an electric arc. The galvanic isolation mechanism 4 is thus not used in the present invention to perform a switching operation in the event of a fault but solely to perform a galvanic isolation function. As a result, it is no longer necessary to provide a quenching chamber as is usually the case for electrical protection devices with arc switching. Furthermore, the electromechanical elements which are usually used to perform an arc switching operation, such as a bimetal and/or a magnetic relay or the like, are replaced by the electronic switching unit 9 in order to perform the same protection functions. This advantageous configuration thus makes it possible to free up space in the housing 12 in modular format so as to place the electronic switching unit 9 therein. It is thus possible for the various electronic and electromechanical components of the electronically switched protection device according to the invention, that is to say at least: the phase current line L, the neutral current line N, the current sensor 1, 1', the electronic protection tripping device 2, the actuator 3, the galvanic isolation mechanism 4, a part of the control mechanism 30 and the electronic switching unit 9, to be contained inside a housing 12 in modular format. Advantageously, the electronically switched protection device according to the invention may replace a traditional modular device that uses arc switching. The electronic switching unit 9 allows a fast switching operation of the order of a microsecond. The invention makes it possible to greatly increase the breaking power and the service life, that is to say the endurance, of the electronically switched protection device that is subjected to faults, all in a modular size.

The electronic switching unit 9 is electrically connected to the electronic protection tripping device 2 (FIG. 4).

For example, the electronic protection tripping device 2 may comprise a microcontroller 31 and where appropriate a power driver 32 (FIG. 4).

In all cases, the electronic protection tripping device 2 preferably makes it possible to process the signals coming from the one or more measurement sensors 1 and which may be representative of a fault of short circuit and/or overload and/or differential type, and to make the electronic switching unit 9 trip and therefore open the electronic switching component 10, 11 (FIGS. 3 and 4).

These signals coming from the one or more current sensors 1, 1' may represent an image of the current I in the phase current line L and/or an image of the differential current ΔI between the phase current line L and the neutral current line N. These signals may be processed by a measurement unit 34 comprised by the electronic protection tripping device 2 and which is shown in FIG. 4. The measurement unit 34 is preferably electrically connected on one side to said at least one current sensor 1, 1' and on the other side to the microcontroller 31.

The voltage between the phase current line L and the neutral current line N may also be measured. This measurement of the network voltage makes it possible to detect faults of overvoltage/undervoltage type. In this case, the measurement unit 34 is electrically connected on one side to the phase current line L and to the neutral current line N (see FIG. 4).

The microcontroller 31 is preferably configured to control the power driver 32 in response to the signals coming from the one or more current sensors 1, 1' and which are preferably processed beforehand by the measurement unit 34. The microcontroller 31 may also be configured to perform other functionalities, such as communicating with other electrical devices.

The power driver 32 is preferably configured to control the electronic switching component 10, 11 in response to the signals coming from the microcontroller 31. The power driver 32 makes it possible to ensure the correct functioning and integrity of said at least one electronic switching component 10, 11.

Said at least one current sensor 1, 1' may preferably consist of a current sensor 1 (FIG. 4) and/or a differential current sensor 1' (FIGS. 3 and 4).

The current sensor 1 is able and intended at least to measure the current flowing through said at least one phase current line L and to emit an acquisition signal that is representative of the image of the current I flowing through said at least one phase current line L. The current sensor 1 makes it possible to detect faults of overload and/or short circuit type.

The differential current sensor 1' is able and intended at least to measure the differential current flowing between said at least one phase current line L and the neutral current line N and to emit an acquisition signal that is representative of the image of the differential current ΔI between the phase current line L and the neutral current line N. The differential current sensor 1' makes it possible to detect differential faults.

The current sensor 1 may consist of a measurement shunt (FIG. 4). Alternatively, the current sensor could very well use another technology of Rogowski type, a current transformer, a Hall effect sensor or the like.

The differential current sensor 1' may consist of a differential measurement toroid (FIGS. 3 and 4).

The electrical power supply 33 may consist of a non-isolated AC-DC converter and be electrically connected in parallel between the phase current line L and the neutral current line N (FIG. 4).

Preferably and as illustrated in FIGS. 1, 2 and 3, said housing 12 has a broadly parallelepipedic shape with a first main face 13 and a second main face 14, and lateral faces, rear 15, lower 16, front 17 and upper 18, respectively, extending between the first and second main faces 13, 14, and with a width, that is to say the separation between the first and second main faces, that is equal to an integer number of times a predetermined distance, called module.

By virtue of this advantageous arrangement, the format of the housing 12 is modular and the result is a modular electronically switched protection device.

The electronically switched protection device shown in FIGS. 1, 2 and 3 has a width of two modules. This example is non-limiting.

Preferably and as illustrated in FIG. 3, said electronic switching unit 9 is arranged in the housing 12 toward the rear lateral face 15.

The electronic switching unit 9 is thus arranged in the vicinity of the rear lateral face 15, that is to say closer to the rear lateral face 15 than the front lateral face 17.

This location used in the prior art for the quenching chamber is now advantageously dedicated to the electronic switching unit 9 and more particularly to the electronic switching components which make it possible to interrupt and to establish the current without using an arc. This location is ideal because it allows the best possible dissipation of the joule losses generated in particular by the electronic switching components 10, 11 of the electronic switching unit 9 on the rear lateral face 15 of the housing 12.

In this case and as illustrated in FIG. 3, said electronic switching unit 9 is preferentially arranged in the housing 12 facing the rear lateral face 15.

This configuration makes it possible to further optimize the dissipation of the joule losses.

Preferably and as shown in FIG. 3, the actuator 3, the galvanic isolation mechanism 4 and the control mechanism 30 form an electromechanical subassembly which is arranged in the housing 12 toward the front face 17 from which the control mechanism 30 protrudes.

This electromechanical subassembly is thus arranged in the vicinity of the front lateral face 17, that is to say closer to the front lateral face 17 than the rear lateral face 15.

Preferentially and as illustrated in FIG. 3, the actuator 3, the galvanic isolation mechanism 4 and the control mechanism 30 form an electromechanical subassembly and said electronic switching unit 9 is arranged in the housing 12 between the electromechanical subassembly and the rear lateral face 15.

When the electronically switched protection device performs a residual current device protection function, the differential current sensor 1' that it includes is preferably part of this electromechanical subassembly (FIG. 3).

Preferentially, said rear lateral face 15 is made of a metal material.

This choice of material makes it possible to optimize heat conduction between the power electronic switching components 10, 11 and a support rail 22, for example a DIN rail, described hereinbelow.

Preferably, said rear lateral face 15 comprises at least one heat sink 19.

Advantageously, the heat sink 19 makes it possible to optimize heat convection with the ambient air.

In this case and as illustrated in FIG. 2, the heat sink 19 preferably comprises a plurality of fins 20.

This geometry makes it possible to optimize heat convection with the ambient air.

Preferentially and as shown in FIGS. 2 and 3, said rear lateral face 15 comprises fastening means 21 for fastening to a preferably metal support rail 22.

Advantageously, the fastening means 21 make it possible to attach the electronically switched protection device to a support rail 22 of DIN rail type.

Preferentially and as illustrated in FIGS. 1 and 2, the first main face 13 and/or the second main face 14 and/or the rear lateral face 15 and/or the lower lateral face 16 and/or the front lateral face 17 and/or the upper lateral face 18 include(s) at least one heat removal opening 23.

Said at least one heat removal opening 23 makes it possible to remove the air heated by the electronic switching unit 9. This advantageous configuration also makes it possible to improve heat dissipation by removing the hot air.

Preferably and as illustrated in FIG. 4, said at least one electronic switching component 10, 11 comprises at least one power transistor, preferentially two power transistors. The two power transistors are preferably connected in series, for example head-to-tail, on the phase current line L.

For example, this power transistor may consist of a bipolar transistor or a field-effect transistor. Said power transistor is controlled by the power driver 32 so as to drive or not drive the electrical current.

The current sensor 1 is preferably a measurement shunt, situated between the two transistors in FIG. 4 and preferably connected in series.

Advantageously, the electronic architecture of the electronically switched protection device makes it possible to envision the addition of supplementary protection functions.

The electronically switched protection device may thus perform a residual current device protection function but also other functionalities, for example measuring current and voltage, protecting against electric arc faults in the installation and adjusting the trip curve or even remote control. All these functionalities may be added without any problems in terms of bulk. The electronically switched protection device according to the invention may thus be complete in terms of protection functions and functionalities.

When the electronically switched protection device performs a residual current device protection function, it preferably comprises a differential current sensor 1' (FIG. 3) making it possible to detect faults of differential fault type.

Of course, the invention is not limited to the embodiments described and shown in the appended drawings. Modifications remain possible, in particular in terms of the makeup of the various elements or by substitution of equivalent techniques, without otherwise departing from the scope of protection of the invention.

The invention claimed is:

1. An electronically switched protection device:

at least one phase current line and one neutral current line, at least one current sensor that is able and intended at least to measure the current flowing through said at least one phase current line or the differential current between the at least one phase current line and the neutral current line and to emit an acquisition signal that is representative of an image of the current flowing through said at least one phase current line or an image of the differential current between the at least one phase current line and the neutral current line, an electronic protection tripping device that is electrically connected to said current sensor and is able and intended at least to process said acquisition signal and where appropriate to emit a protective tripping control signal that is representative of the occurrence of a fault, an actuator that is electrically connected to said electronic protection tripping device, a galvanic isolation mechanism comprising at least a first pair of contacts with a first fixed contact and a first mobile contact that are arranged on the phase current line and a second pair of contacts with a second fixed contact and a second mobile contact that are arranged on the neutral current line, said galvanic isolation mechanism being able and intended to be actuated by a control mechanism of lever type designed to open or close the first and second pairs of contacts or by said actuator, wherein said electronically switched protection device comprises:

an electronic switching unit comprising at least one power electronic switching component that is respectively arranged on said at least one phase current line, said electronic switching unit being able and intended to be made to trip by said protective tripping control signal that is representative of the occurrence of the fault so as to open said at least one electronic switching component, an electrical power supply that is configured to supply power to the electronic protection tripping device and to the electronic switching unit, in that the actuator is configured to actuate the opening of the first and second pairs of contacts consecutively with the opening of said at least one electronic switching component, and in that the electronically switched protection device comprises a housing in modular format.

2. The electronically switched protection device as claimed in claim 1, wherein said housing has a broadly parallelepipedic shape with a first main face and a second main face, and lateral faces, rear, lower, front and upper, respectively, extending between the first and second main faces, and with a width, that is to say the separation between the first and second main faces, that is equal to a non-zero, natural integer number of times a predetermined distance.

3. The electronically switched protection device as claimed in claim 2, wherein said electronic switching unit is arranged in the housing toward the rear lateral face.

4. The electronically switched protection device as claimed in claim 2, wherein the actuator, the galvanic isolation mechanism and the control mechanism form an electromechanical subassembly which is arranged in the housing toward the front face from which the control mechanism protrudes.

5. The electronically switched protection device as claimed in claim 2, wherein the actuator, the galvanic isolation mechanism and the control mechanism form an electromechanical subassembly and in that said electronic switching unit is arranged in the housing between the electromechanical subassembly and the rear lateral face.

6. The electronically switched protection device as claimed in claim 2, wherein said rear lateral face is made of a metal material.

7. The electronically switched protection device as claimed in claim 2, wherein said rear lateral face comprises at least one heat sink.

8. The electronically switched protection device as claimed in claim 7, wherein the heat sink comprises a plurality of fins.

9. The electronically switched protection device as claimed in claim 2, wherein said rear lateral face comprises fastening mean for fastening to a preferably metal support rail.

10. The electronic protection device as claimed in claim 2, wherein the first main face and/or the second main face and/or the rear lateral face and/or the lower lateral face and/or the front lateral face and/or the upper lateral face includes at least one heat removal opening.

11. The electronically switched protection device as claimed in claim 1, wherein said at least one electronic switching component comprises at least one power transistor.

\* \* \* \* \*